United States Patent [19]
Las Navas Garcia

[11] Patent Number: 5,511,439
[45] Date of Patent: Apr. 30, 1996

[54] PUSHING MECHANSIM

[76] Inventor: Jose M. Las Navas Garcia, Paseo de la Castellana, 28046 Madrid, Spain

[21] Appl. No.: 378,526

[22] Filed: Jan. 26, 1995

[30] Foreign Application Priority Data

Jul. 22, 1994 [ES] Spain ..................................... 9401635

[51] Int. Cl.$^6$ .................................................. F16H 25/20
[52] U.S. Cl. .................................. 74/424.8 R; 74/89.15; 254/98
[58] Field of Search ........................... 74/89.15, 424.8 R; 254/98, DIG. 2, DIG. 8

[56] References Cited

U.S. PATENT DOCUMENTS

| | | |
|---|---|---|
| 2,247,562 | 7/1941 | Santen . |
| 2,490,040 | 12/1949 | Frerer ............................................ 172/36 |
| 2,818,743 | 1/1958 | Zatsky ............................................ 74/393 |
| 3,319,481 | 5/1967 | Goodman ............................ 74/424.8 R |
| 3,361,240 | 1/1968 | Cagle ............................................ 192/141 |
| 3,606,801 | 9/1971 | Williams ............................. 74/424.8 R |
| 3,727,472 | 4/1973 | Maekawa ............................... 74/89.15 |
| 4,000,661 | 1/1977 | Menzel .................................... 74/89.15 |
| 4,431,093 | 2/1984 | Yang .................................. 74/89.15 X |
| 4,496,865 | 1/1985 | Allen ........................................... 310/80 |
| 4,858,491 | 8/1989 | Shube ........................................ 74/665 |
| 5,099,161 | 3/1992 | Wolfbauer, III .................... 74/424.8 R |
| 5,129,273 | 7/1992 | Fukui et al. ............................ 74/89.15 |

FOREIGN PATENT DOCUMENTS 2668232 4/1992 France .................................. 74/89.15

*Primary Examiner*—Richard M. Lorence
*Assistant Examiner*—Troy Grabow
*Attorney, Agent, or Firm*—Steven H. Bazerman

[57] ABSTRACT

A pushing mechanism has a hollow slotted tube which receives radially extending pins of a threaded shaft. The tube is rotated by the rotor of a motor and is threadably received within an axially and rotationally fixed nut that is connected to a housing which, in turn, is fixed to the motor housing. Rotation of the shaft through the pins causes the shaft to move axially. An outer threadless end of the shaft extends beyond the housing for pushing outside mechanisms such as the stage of a microscope, a micro hardness tester or even a hydraulic cylinder.

15 Claims, 2 Drawing Sheets ns
PUSHING MECHANSIM

FIELD AND BACKGROUND OF THE INVENTION

The present invention relates to a mechanical pushing, or thrust devices, and in particular to a new and useful pushing mechanism that can be utilized in a variety of fields where precise yet strong pushing force is needed.

A wide variety of mechanical pushing devices are known. Many of these use externally threaded shafts which rotate within internally threaded nuts for axial movement of one of the threaded components. The shaft is driven either directly or indirectly by a motor or other rotary drive mechanism and the shaft is either axially fixed or axially moveable, in addition to its rotary motion.

U.S. Pat. No. 2,247,562 is an example of a thrust mechanism having a moveable threaded shaft. Other U.S. patents which are relevant to the pushing mechanism of the present invention are U.S. Pat. Nos. 2,490,040; 2,818,743; 3,361,240; 3,606,801; 3,727,472; 4,000,661; 4,496,865; and 4,858,491.

U.S. Pat. No. 3,361,240 requires two elements attached to the rotor of a motor rather than a single slotted tube which will be explained later and used in accordance with the invention. U.S. Pat. No. 2,818,743 uses angular motion for an angular function whereas the present invention converts angular motion to linear motion. U.S. Pat. No. 4,000,661 is a moving nut system as are U.S. Pat. Nos. 3,606,801; 4,848,491; 3,727,472 and 2,490,040.

U.S. Pat. No. 2,247,562 uses various parts to achieve axial movement in a complex arrangement.

U.S. Pat. No. 4,496,865 uses an output shaft connected directly to a spindle and a moving nut. The motor appears to move in this arrangement.

A need remains for a simple, yet rugged, pushing mechanism which is both extremely accurate and useable, for example, to move microscope stages, in micro hardness testers and similar small movement, accurate devices, and which is also appropriate for heavy uses such as for compressing hydraulic cylinders for hydraulic applications.

SUMMARY OF THE INVENTION

An object of the present invention is to provide an accurate, yet forceful, pushing mechanism which has a small number of parts yet operates in a satisfactory and long-term manner without excessive maintenance.

Accordingly, a further object of the invention is to provide a pushing mechanism comprising; a hollow tube having a pair of diametrically opposed axially extending slots; motor means connected to the tube for rotating the tube; a thrust shaft having a first end with a pair of pins which respectively extend into the pair of slots and are slidable along the pair of slots with relative axially movement between the shaft and the tube, the shaft having a threaded portion adjacent the first end and an opposite second end with a threadless portion; a nut for threadably receiving the threaded portion of the shaft; and a housing connected to the motor means for rotatably and axially fixing the housing to the motor means, the nut being axially and rotatably fixed to the housing so that rotation of the tube causes axially movement of the tube in the nut, the threadless portion having a length which extends at least partly beyond the housing for axial movement of the threadless portion beyond the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
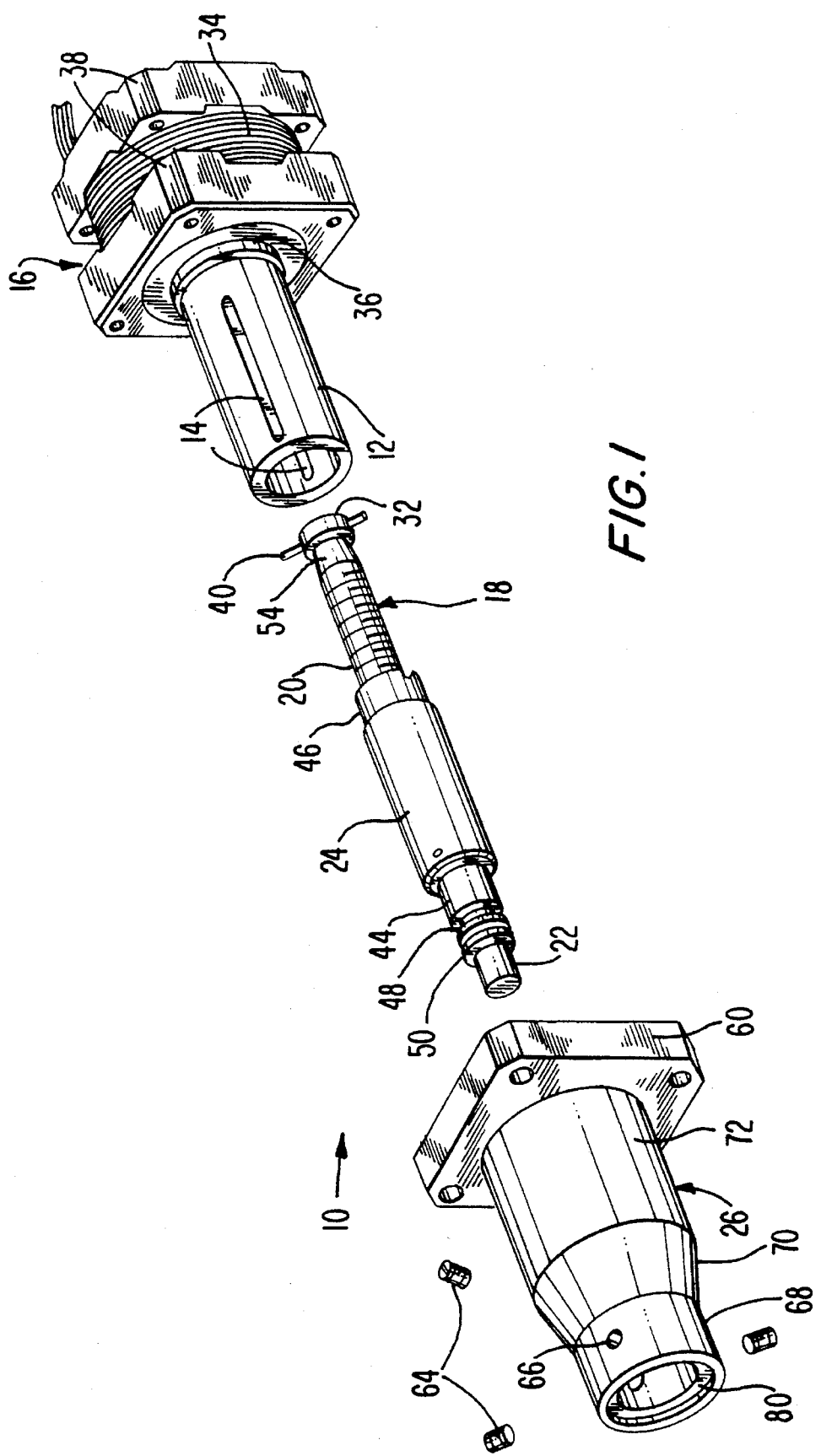
FIG. 1 is an exploded perspective view of the pushing mechanism of the present invention.
Figure 2:
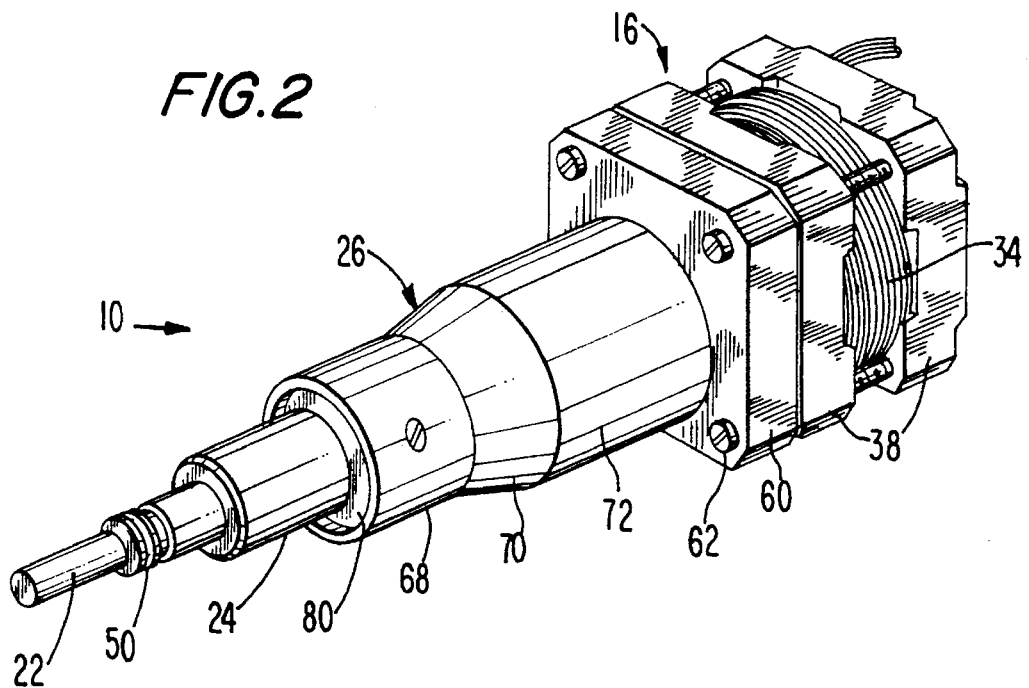
FIG. 2 is an assembled perspective view of the invention.

Referring to the drawings, the invention embodied therein comprises a pushing mechanism generally designated 10 which includes a hollow cylindrical tube 12 containing a pair of diametrically opposed, axially extending slots 14.

Tube 12 is fixed to the rotor 36 of an electric motor generally designated 16 which may be a stepper motor or conventional electric motor which includes a fixed armature 34 and housing portions 38.

Figure 3:
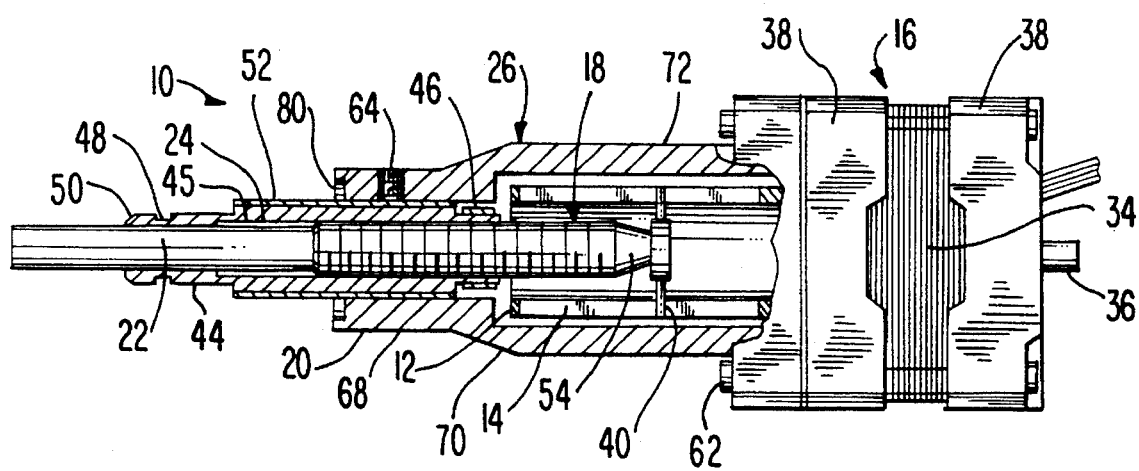
FIG. 3 is a sectional view, partly in elevation, of the mechanism.

A thrust shaft 18 which includes a threaded portion 20 and a smaller diameter threadless portion 22, has a first end with a cylindrical disk 32 and a pair of radially extending pins 40 which, as best shown in FIG. 3, respectively engage into and are axially moveable along the pair of slots 14.

A nut 24, internally threaded along at least part of its length, receives the threaded portion 20 and other parts of the thrust shaft 18 as best shown in FIG. 3. As shown in FIG. 1, nut 24 has a large diameter central portion and a pair of axially extending opposite smaller diameter portions 44 and 46 which extend over parts of shaft 18. An even smaller diameter step or ring portion 48 extends forwardly of small diameter portion 44 and carries a further small diameter and externally threaded portion 50. The thread can be directly formed in nut 24 or, alternatively, smaller diameter portion 46 may be a separate wear restricted nut encapsulated in nut 24 to form the threaded portion of nut 24.

As best shown in FIG. 3, a separate outer ring forms part of the rearwardly extending small diameter portion 46 and a wear-resistant hard metal ring 52 extends around the large diameter central portion of the nut 24.

As also shown in FIG. 3, the inside diameter of the central portion of the nut and at least part of the forward portion 44, carries the internal thread of nut 24 and threadably receives the threaded portion 20 of shaft 18. Forward of this however, the inside diameter of cylindrical portion 44 is reduced so that it closely approaches the outside diameter of threadless portion 22, as does the inside diameters of portions 48 and 50. This acts as a stop to the outward movement of shaft 18 as the threaded portion meets a step 45 formed by the inside diameter of portion 44.

At this point it is also mentioned that a conical portion 54 which has a large diameter end connected to threaded portion 20, also has a small diameter end connected to the disk 32 as shown in FIGS. 1 and 3.

The invention also includes an outer housing generally designated 26, which has a plate or flange 60 which is bolted, for example with bolts 62, at four locations to the housing portions 38 of motor 16, to fix the housing. Threaded set screws 64 which are threaded into three diametrically opposed threaded holes 66 on an outer small diameter end 68 of housing 26, are threaded against the outer surface of nut 24, and specifically against the hard metal ring 52. This axially and rotationally fixes nut 24 to the housing 26 which itself is rotatably and axially fixed with respect to the motor housing 38. A conical section 70 connects the forward section 68 of housing 26 to a main cylindrical body 72 which is connected to the plate 60. As shown in FIG. 3, internally body 72 has a large internal diameter for receiving the slotted tube 12 and a smaller diameter portion for receiving the nut. A portion of the nut extends beyond the end of housing 26 and a portion of the threadless shaft part 22 extends beyond the nut, and particularly beyond the thread portion 50 of the nut.

Thread portion 50 is used for attaching fixed portions of the pushing mechanism to fixed portions of the mechanism to be pushed (not shown). A ball or other engagement element can be attached to the end of threadless portion 22 as needed for installing the invention. A cylindrical recess or step 80 is provided in the face of front portion 68 of housing 26, to help accommodate structures to be used with the present invention.

While a specific embodiment of the invention has been shown and described in detail to illustrate the application of the principles of the invention, it will be understood that the invention may be embodied otherwise without departing from such principles.

What is claimed is:

1. A pushing mechanism comprising;
   a hollow tube having a pair of diametrically opposed axially extending slots;
   motor means connected to the tube for rotating the tube;
   a thrust shaft having a first end with a pair of pins which respectively extend into the pair of slots and are slidable along the pair of slots with relative axial movement between the shaft and the tube, the shaft having a threaded portion adjacent the first end and an opposite second end with a threadless portion;
   a nut for threadably receiving the threaded portion of the shaft; and
   a housing connected to the motor means for rotatably and axially fixing the nut, the nut being axially and rotatably fixed to the housing so that rotation of the tube causes axial movement of the shaft in the nut, the threadless portion having a length which extends at least partly beyond the housing for axial movement of the threadless portion beyond the housing.

2. A pushing mechanism according to claim 1 wherein the nut includes a portion which extends beyond the housing, the portion of the nut which extends beyond the housing extending around the threadless portion of the shaft and itself being at least partly threaded internally to engage with said threaded portion of said shaft.

3. A pushing mechanism according to claim 2 wherein the nut contains a central large diameter portion and opposite axially extending small diameter portions, one of the small diameter portions extends beyond the housing and is internally thread.

4. A pushing mechanism according to claim 3 wherein one of the small diameter portions of the nut which extends beyond the housing has an inside diameter for closely engaging around the threadless portion of the shaft, and a larger internal diameter for threadably receiving the threaded portion of the shaft, the inside diameter for closely engaging the threadless portion acting as a stop for the threaded portion of the shaft.

5. A pushing mechanism according to claim 1 including a hard, wear resistant ring around the nut, and at least one set screw threaded into the housing and against the ring for axially and rotatably fixing the nut to the housing.

6. A pushing mechanism according to claim 5 wherein the shaft includes a disk at said first end for carrying the pins, the pins extending outwardly radially from the disk, and a conical portion connected between the disk and the threaded portion of the shaft.

7. A pushing mechanism according to claim 1 wherein the housing includes a cylindrical portion for engaging around the tube and a plate for fixing to the motor means.

8. A pushing mechanism according to claim 7 wherein the motor means comprises an electric motor having a rotor connected to the tube and a stator assembly, the stator assembly being connected to the plate of the housing.

9. A pushing mechanism according to claim 7 wherein the housing includes a large diameter cylindrical portion around the tube a small diameter cylindrical portion around the nut and a conical portion connected between the large and small diameter portions of the housing.

10. A pushing mechanism according to claim 9 wherein the small diameter portion of the housing has a front end around the nut with a cylindrical recessed step therein.

11. A pushing mechanism according to claim 1 wherein the nut includes a central large diameter portion for threadably receiving the threaded portion of the shaft, and a pair of oppositely extending cylindrical small diameter portions, one of these small diameter portions extending outside of the housing and including a smaller diameter ring and an outer outwardly threaded portion engaged around the threadless portion of the shaft.

12. A pushing mechanism according to claim 11 including a wear resistant ring around the large diameter portion of the nut.

13. A pushing mechanism according to claim 1 wherein the threadless portion is cylindrical and has a smaller diameter than the threaded portion.

14. A pushing mechanism according to claim 13 including a disk at the first end of the shaft for carrying the pins and a conical portion connected between the disk and the threaded portion of the shaft.

15. A pushing mechanism according to claim 1 wherein the motor means is a stepper motor with a rotor connected to the tube and a stator connected to the housing.

\* \* \* \* \*